United States Patent
Tian et al.

(10) Patent No.: US 12,381,984 B2
(45) Date of Patent: Aug. 5, 2025

(54) EMERGENCY ALARM PROCESSING METHOD AND EMERGENCY ALARM PROCESSING SYSTEM

(71) Applicant: BOE Technology Group Co., Ltd., Beijing (CN)

(72) Inventors: Fuchen Tian, Beijing (CN); Can Cui, Beijing (CN); Fang Zhai, Beijing (CN)

(73) Assignee: BOE Technology Group Co., Ltd., Beijing (CN)

(*) Notice: Subject to any disclaimer, the term of this patent is extended or adjusted under 35 U.S.C. 154(b) by 0 days.

(21) Appl. No.: 17/905,300

(22) PCT Filed: Jun. 25, 2021

(86) PCT No.: PCT/CN2021/102517
§ 371 (c)(1),
(2) Date: Aug. 30, 2022

(87) PCT Pub. No.: WO2022/267048
PCT Pub. Date: Dec. 29, 2022

(65) Prior Publication Data
US 2024/0259499 A1    Aug. 1, 2024

(51) Int. Cl.
*H04M 3/523* (2006.01)

(52) U.S. Cl.
CPC ...... *H04M 3/5238* (2013.01); *H04M 2242/04* (2013.01)

(58) Field of Classification Search
CPC .................................................. H04M 3/5238
USPC ...................................................... 455/404.1
See application file for complete search history.

(56) References Cited

U.S. PATENT DOCUMENTS

2002/0165747 A1    11/2002   Shriver et al.
2009/0316687 A1*   12/2009   Kruppa .............. H04L 67/1065
                                                          709/205

FOREIGN PATENT DOCUMENTS

| CN | 101237493 A |   | 8/2008 |            |
|----|-------------|---|--------|------------|
| CN | 105306349 A |   | 2/2016 |            |
| CN | 106453977 A |   | 2/2017 |            |
| CN | 107181880   | * | 5/2017 | H04M 3/523 |

(Continued)

OTHER PUBLICATIONS

International Search Report & Written Opinion mailed Feb. 16, 2022, regarding PCT/CN2021/102517; English translation attached.

(Continued)

*Primary Examiner* — Maria El-Zoobi
(74) *Attorney, Agent, or Firm* — Intellectual Valley Law, P.C.

(57) ABSTRACT

The present disclosure provides an emergency alarm processing method and an emergency alarm processing system. The emergency alarm processing method includes: receiving an emergency access request; according to the access means of the emergency access request, storing the emergency access request into subqueues of a unified queuing queue, wherein the unified queuing queue includes at least two subqueues, each of the subqueues is used for storing the emergency access request of at least one access means, and the access means of the emergency access request stored in each of the subqueues are different; allocating an emergency access request in the unified queuing queue to a target alarm dispatching seat supporting a corresponding access means.

19 Claims, 4 Drawing Sheets

(56) References Cited

FOREIGN PATENT DOCUMENTS

| | | |
|---|---|---|
| CN | 107181880 A | 9/2017 |
| CN | 108063766 A | 5/2018 |
| CN | 110721428 A | 1/2020 |
| CN | 111127828 A | 5/2020 |
| CN | 210518506 U | 5/2020 |

OTHER PUBLICATIONS

First Office Action in the Chinese Patent Application No. 202180001642.1, dated Dec. 30, 2024; English translation attached.

* cited by examiner

EMERGENCY ALARM PROCESSING METHOD AND EMERGENCY ALARM PROCESSING SYSTEM

CROSS-REFERENCE TO RELATED APPLICATION

This application is a national stage application under 35 U.S.C. § 371 of International Application No. PCT/CN2021/102517, filed Jun. 25, 2021, the contents of which are incorporated by reference in the entirety.

TECHNICAL FIELD

Embodiments of the present disclosure relate to the medical emergency technical field, and more particularly to an emergency alarm processing method and an emergency alarm processing system.

BACKGROUND

Traditional emergency alarm only supports access means which calls for help by calling 120. With the development of technology, infrastructure and intelligent equipment, access means which only calls for help by calling 120 cannot meet the needs of user, and needs to support the emergency alarms of various access means. Therefore, how to schedule the emergency alarms of various access means is an urgent technical problem.

SUMMARY

Embodiments of the present disclosure provide an emergency alarm processing method and an emergency alarm processing system.

In a first aspect, embodiments of the present disclosure provide an emergency alarm processing method, including:
receiving an emergency access request;
according to the access means of the emergency access request, storing the emergency access request into the subqueue of the unified queuing queue, wherein the unified queuing queue includes at least two subqueues, each of the subqueues is used for storing the emergency access request of at least one access means, and the access means of the emergency access request stored in each of the subqueues is different; and
allocating the emergency access request in the unified queuing queue to the target alarm dispatching seat supporting the corresponding access means.

In a possible embodiment of the present disclosure, the access means includes at least two of: the emergency alarm telephone access means, the voice or video access means and the customer service window access means.

In a possible embodiment of the present disclosure, allocating the emergency access request in the unified queuing queue to the target alarm dispatching seat supporting the corresponding access means includes:
allocation mode I:
determining a target alarm dispatching seat of the emergency access request to be received; and
selecting an emergency access request matching the access means supported by the target alarm dispatching seat from the unified queuing queue, and allocating the selected emergency access request to the target alarm dispatching seat;
or
allocation mode II:
determining an emergency access request to be dequeued from the unified queuing queue; and
selecting a target alarm dispatching seat supporting the access means of the emergency access request from a plurality of candidate alarm dispatching seats, and allocating the emergency access request to be dequeued to the target alarm dispatching seat.

In a possible embodiment of the present disclosure, the target alarm dispatching seat is an alarm dispatching seat currently in an idle state.

In a possible embodiment of the present disclosure, allocating the emergency access request in the unified queuing queue to the target alarm dispatching seat supporting the corresponding access means further includes:
determining to adopt allocation mode I or allocation mode II, wherein:
if only one alarm dispatching seat is currently in an idle state, or if only one alarm dispatching seat currently supporting the same access means is in an idle state, the allocation mode I is used;
if there are currently a plurality of alarm dispatching seats in an idle state, or if there are currently a plurality of alarm dispatching seats supporting the same access means in an idle state, the allocation mode II is used.

In a possible embodiment of the present disclosure, in the allocation mode I, selecting an emergency access request matching the access means supported by the target alarm dispatching seat from the unified queuing queue includes:
if the target alarm dispatching seat only supports listening to an emergency access request of an access means, selecting an emergency access request from the subqueue matching the access means supported by the target alarm dispatching seat.

In a possible embodiment of the present disclosure, in the allocation mode I, selecting an emergency access request matching the access means supported by the target alarm dispatching seat from the unified queuing queue includes:
if the target alarm dispatching seat supports listening to an emergency access request of at least two access means, selecting an emergency access request from at least two subqueues matching the at least two access means supported by the target alarm dispatching seat.

In a possible embodiment of the present disclosure, an emergency access request is selected from the unified queuing queue according to at least one of the following strategies:
rounding according to the sequence of the emergency access request;
random selection;
selecting according to the time when the emergency access request enters the unified queuing queue;
selecting according to the waiting time of the emergency access request at the unified queuing queue;
selecting according to the length of subqueue; and
select according to the number of calls corresponding to the emergency access request.

In a possible embodiment of the present disclosure, determining the emergency access request to be dequeued from the unified queuing queue includes:
if there are currently a plurality of alarm dispatching seats in an idle state, or if there are currently a plurality of alarm dispatching seats supporting the same access means in an idle state, determining an emergency access request to be dequeued from the unified queuing queue, the access means of the emergency access request to be dequeued being the same as the access means supported by at least one alarm dispatching seat in the plurality of alarm dispatching seats in an idle state.

In a possible embodiment of the present disclosure, selecting a target alarm dispatching seat supporting an access means of the emergency access request from a plurality of candidate alarm dispatching seats according to at least one of the following strategies includes:

selecting according to the number of received alarms;
selecting according to the duration of received alarms;
polling selection according to the sequence of the alarm dispatching seat;
random selection;
selecting according to the weight;
selecting according to the history record of received alarms;
selecting according to the source of the emergency access request; and
selecting the alarm dispatching seat that last processed the same access type.

In some embodiments, an emergency access request is selected as a dequeue request from the unified queuing queue in a first-in-first-out manner, i.e. according to the time when the emergency access request entered the unified queuing queue. Then, an alarm dispatching seat corresponding to its access means is randomly selected as a target alarm dispatching seat among a plurality of alarm dispatching seats in an idle state.

In a possible embodiment of the present disclosure, allocating an emergency access request in the unified queuing queue to the target alarm dispatching seat supporting the corresponding access means, then further includes:

transferring the emergency access request from the alarm dispatching seat that originally received the emergency access request to other alarm dispatching seat.

In a possible embodiment of the present disclosure, transferring the emergency access request from the alarm dispatching seat that originally received the emergency access request to other alarm dispatching seat according to at least one of the following information:

a service type supported by the alarm dispatching seat, the service type including at least one of the following: alarm reception, complaints and consultation; and
the expertise of dispatchers at the alarm dispatching seat.

In a possible embodiment of the present disclosure, allocating the emergency access request in the unified queuing queue to the target alarm dispatching seat supporting the corresponding access means, then further includes:

sending a vehicle dispatching request of the target alarm dispatching seat to a vehicle dispatching seat, and the vehicle dispatching seat uniformly allocating an emergency vehicle, wherein the vehicle dispatching seat does not support receiving an emergency access request and supports dispatching the emergency vehicle.

In a possible embodiment of the present disclosure, allocating the emergency access request in the unified queuing queue to the target alarm dispatching seat supporting the corresponding access means, then further includes:

updating the state of the target alarm dispatching seat to a busy state until the target alarm dispatching seat finishes receiving an alarm this time.

In a second aspect, embodiments of the present disclosure provide an emergency alarm processing system, including:

a receiving module for receiving emergency access request;
a storage module for storing the emergency access request into a subqueue of a unified queuing queue according to the access means of the emergency access request, wherein the unified queuing queue includes at least two subqueues, each of the subqueues is used for storing an emergency access request of an access means, and the access means of the emergency access request stored in each of the subqueues is different; and
a dispatching module for allocating an emergency access request in the unified queuing queue to a target alarm dispatching seat supporting a corresponding access means.

In a third aspect, embodiments of the present disclosure provide an electronic device including a processor, a memory, and a program or Instruction stored on the memory and executable on the processor, the program or Instruction when executed by the processor implementing the steps of the emergency alarm processing method of the first aspect above.

In a fourth aspect, embodiments of the present disclosure provide a readable storage media having stored thereon a program or Instruction that when executed by processor implements the emergency alarm processing method of the first aspect.

BRIEF DESCRIPTION OF THE DRAWINGS

Numerous additional advantages and benefits will become apparent to those of ordinary skill in the art upon reading the following detailed description of the preferred embodiment. The drawings are only for purposes of illustrating the preferred embodiment and are not to be construed as limiting the disclosure. Moreover, the same reference numerals designate the same parts throughout the several drawings. In the drawings.

DETAILED DESCRIPTION

The technical solution according to the embodiments of the present disclosure will be clearly and completely described below in connection with the accompanying drawings in embodiments of the present disclosure, and it is apparent that the described embodiments are a part of the embodiments of the present disclosure rather than the whole embodiments. Based on the embodiments of the present disclosure, all other embodiments obtained by a person of ordinary skill in the art without involving any inventive effort are range in the present disclosure.

The pre-hospital emergency system (smart emergency system) may include an alarm end, a dispatching center end, a doctor end, a driver end, and a management end. The user alarms via the alarm end, and when receiving an alarm request, the dispatching center needs to allocate an alarm dispatching seat (namely, a dispatcher) for an alarm person. The dispatchers of the dispatching center receive the alarm request via the dispatching center and dispatches the ambulance vehicle and the ambulance resource, etc. and the dispatchers of the dispatching center can also dispatch the driver and the doctor. The driver is an employee assigned to drive an ambulance vehicle to the alert location, and the doctor is an employee assigned to travel with the ambulance to the alert location. The driver uses driver end for navigation, and the doctor can use the doctor end to enter EMR information and treatment information to the personnel to be treated on the ambulance, etc. The alarm end, the dispatching center end, the doctor end, the driver end and the management end can be an electronic device, such as a mobile phone, a tablet, a computer, an all-in-one machine, etc.

Figure 1:
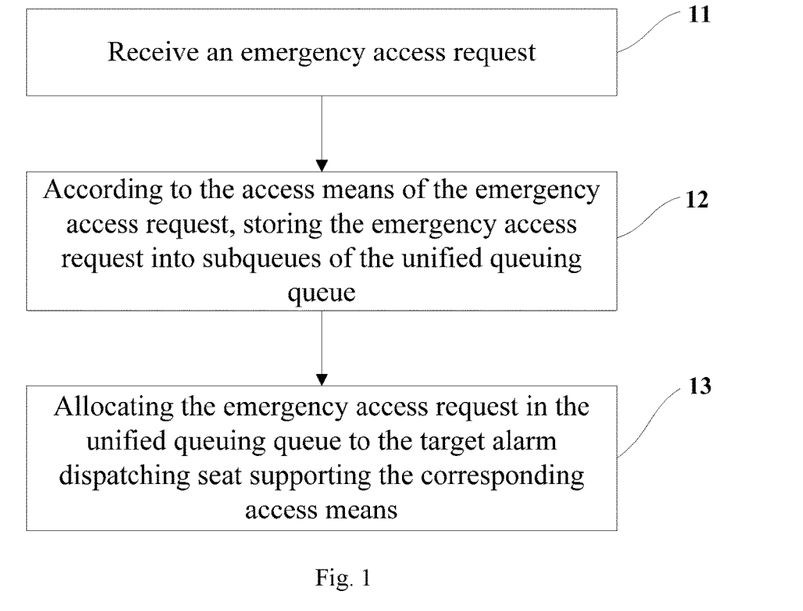
FIG. 1 is a flow diagram of an emergency alarm processing method according to one embodiment of the present disclosure.

With reference to FIG. 1, embodiments of the present disclosure provide an emergency alarm processing method, wherein the executor of the method can be any electronic device. For example, the method can be applied to an application program with a emergency alarm processing function, and the method can be executed by a server of the application program or a terminal equipment. In a possible embodiment of the present disclosure, the method can be executed by an emergency alarm processing system, and the method includes:

step 11: receiving an emergency access request;

In embodiments of the present disclosure, emergency alarm processing system supports an emergency access request receiving at least two access means. For example, the access means may include at least two of the following access means: the emergency alarm telephone access means, the voice or video access means and the customer service window access means. The emergency alarm telephone access means is accessed through a 120 emergency telephone. Voice or video access means is accessed through voice or video. Customer service window access means is accessed by sending text information in customer service window, similar to customer service window of Taobao.

Figure 2:
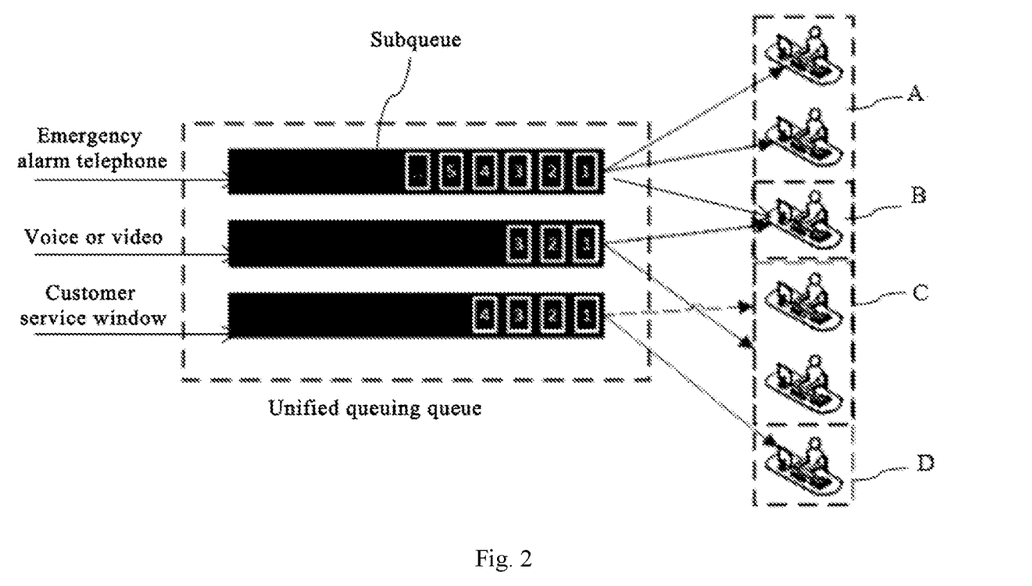
FIG. 2 is a schematic diagram of the structure of an emergency alarm processing system according to one embodiment of the present disclosure.

Step 12: according to the access means of the emergency access request, storing the emergency access request into the subqueue of the unified queuing queue, wherein the unified queuing queue includes at least two subqueues, each of the subqueues is used for storing the emergency access request of at least one access means, and the access means of the emergency access request stored in each of the subqueues is different;

Referring to FIG. 2, FIG. 2 is a schematic diagram of the structure of an emergency alarm processing system according to one embodiment of the present disclosure. According to the embodiment shown in FIG. 2, the emergency alarm processing system supports three types of access means: the emergency alarm telephone access means, the voice or video access means and the customer service window access means, then unified queuing queue including three subqueues for storing the emergency access request of the emergency alarm telephone access means, the voice or video access means and the customer service window access means, respectively. In some embodiments of the present disclosure, voice and video access means can also be separated, i.e. emergency alarm processing system supports four access means: the emergency alarm telephone access means, the voice access means, the video access means and the customer service window access means. After receiving the emergency access request, the emergency alarm processing system stores the emergency access request into a corresponding subqueue according to the access means of the emergency access request.

In some embodiments, each of the subqueues stores only one access request, and each of the subqueues may also store multiple access requests. For example, voice or video access requests and customer service window access requests are stored in the same subqueue.

In some embodiments, the unified queuing queue may also have only one subqueue, and different ways of emergency access request are stored and queued in the queue waiting to be dequeued. For example, emergency call access means, voice or video access means and customer service window access means are in the same subqueue.

Step 13: allocating the emergency access request in the unified queuing queue to the target alarm dispatching seat supporting the corresponding access means.

In embodiments of the present disclosure, the emergency alarm processing system includes a plurality of alarm dispatching seats, and in a possible embodiment of the present disclosure, each of the alarm dispatching seats supports listening to the emergency access request of at least one access means. That is, the alarm dispatching seat includes an alarm dispatching seat supporting one access means and/or an alarm dispatching seat supporting at least two access means. Setting an alarm dispatching seat that supports at least two access means makes the allocation of emergency access request more flexible.

With reference to FIG. 2, in embodiments shown in FIG. 2, alarm dispatching seat A only supports listening to the emergency access request of one access means. For example, the emergency access request only supporting listening to the emergency alarm telephone access means opens a line with a carrier. Alarm dispatching seat B supports emergency access request for two access means, such as the emergency access request for the emergency alarm telephone access means and voice or video access means. Alarm dispatching seat C supports listening to emergency access request for two access means, such as emergency access request for customer service window access means and voice or video access means. Alarm dispatching seat D only supports listening to an emergency access request for access means, such as emergency access request for customer service window access means. In embodiments of the present disclosure, the emergency access request to be allocated in the unified queuing queue is allocated to the alarm dispatching seat supporting the access means for the emergency access request to be allocated. For example, the emergency access request for the voice access means to be allocated in the unified queuing queue is allocated to the alarm dispatching seat A supporting the voice access means, or the alarm dispatching seat B supporting the voice access means and the video access means. In FIG. 2, the numbers 1, 2, 3. etc. in the subqueue indicate the sequence numbers of the queued emergency access request.

In embodiments of the present disclosure, alarm dispatching seat supporting voice or video access means needs to be equipped with equipment such as camera, headset, etc. Supporting a customer service window access means, an alarm dispatching seat requires equipment such as PC, cellphone or tablet.

In embodiments of the present disclosure, the emergency alarm processing system supports receiving the emergency access request of a plurality of access means, and uniformly queues and uniformly schedules the received emergency access request, and allocates to the alarm dispatching seat of the access means supporting the emergency access request, so as to orderly and reasonably allocate the emergency access request, and avoid the problems of idle resources, robbing, and unbalanced queuing processing, etc.

The following embodiments describes in detail the method for allocating the emergency access request in the unified queuing queue to the target alarm dispatching seat supporting the corresponding access means.

In some possible embodiments of the present disclosure, allocating the emergency access request in the unified queuing queue to the target alarm dispatching seat supporting the corresponding access means includes:

allocation mode I:
determining a target alarm dispatching seat of the emergency access request to be received; and
selecting an emergency access request matching the access means supported by the target alarm dispatching seat from the unified queuing queue, and allocating the selected emergency access request to the target alarm dispatching seat.

Namely, in embodiments of the present disclosure, firstly the target alarm dispatching seat of the emergency access request to be received is determined, and then an emergency access request matching the access means supported by the target alarm dispatching seat for the determined target alarm dispatching seat is selected.

In one possible embodiment of the present disclosure, alarm dispatching seat has busy state and idle state, wherein busy state means alarm dispatching seat is processing emergency access request, and idle state means alarm dispatching seat is not processing emergency access request, indicating that emergency access request can be received.

In a possible embodiment of the present disclosure, the target alarm dispatching seat is an alarm dispatching seat currently in an idle state.

In embodiments of the present disclosure, allocation mode I is generally applied to the following scenarios:

Scenario 1: only one alarm dispatching seat is currently in an idle state, and other alarm dispatching seat are in a busy state, at this time, the alarm dispatching seat in the idle state is taken as a target alarm dispatching seat;

Scenario II: in the case where only one alarm dispatching seat supporting the same access means is in an idle state, at this time, the alarm dispatching seat supporting such access means in an idle state is taken as a target alarm dispatching seat.

For example, only one alarm dispatching seat supporting the emergency alarm telephone access means is in an idle state, and the other alarm dispatching seat supporting the emergency alarm telephone access means is in a busy state; at this time, the alarm dispatching seat supporting the emergency alarm telephone access means in an idle state is taken as a target alarm dispatching seat. At this time, if only one alarm dispatching seat supporting the client window access means is also in the idle state, the alarm dispatching seat supporting the client window access means in the idle state also needs to be taken as the target alarm dispatching seat. That is, the number of target alarm dispatching seat is not limited to one.

In some possible embodiments of the present disclosure, in the allocation mode I, selecting an emergency access request matching an access means supported by the target alarm dispatching seat from the unified queuing queue includes: if the target alarm dispatching seat only supports listening to an emergency access request of an access means, selecting an emergency access request from the subqueue matching the access means supported by the target alarm dispatching seat.

In some possible embodiments of the present disclosure, in the allocation mode I, selecting an emergency access request matching an access means supported by the target alarm dispatching seat from the unified queuing queue includes: if the target alarm dispatching seat supports listening to the emergency access request of at least two access means, selecting an emergency access request from at least two subqueue matching the at least two access means supported by the target alarm dispatching seat.

In some embodiment, each of the queues can be scheduled independently by using a different dispatching algorithm/strategy.

In some embodiments of the present disclosure, an emergency access request is selected from the unified queuing queue according to at least one of the following strategies:
1) rounding according to the sequence of the emergency access request; wherein
   such a strategy ensures that the emergency access request in each of the subqueues has a chance to dequeue.
2) random selection; wherein
   such a strategy ensures that the emergency access request in each of the subqueues has almost the same probability of being dequeued.
3) selecting according to the time when the emergency access request enters the unified queuing queue; wherein
   such a strategy ensures that the emergency access request that first enters unified queuing queue is preferentially dequeued.
4) selecting according to the waiting time of the emergency access request at the unified queuing queue; wherein
   such a strategy can guarantee a high latency emergency access request to be dequeued first.
5) selecting according to the length of subqueue;
   for example, selecting a subqueue with the longest length from at least two matched subqueues while the length of the subqueue refers to the number of stored emergency access request; wherein
   such a strategy can guarantee that emergency access request in subqueue with a large number of emergency access requests are preferentially dequeued.
6) selecting according to the number of calls corresponding to emergency access request; wherein
   such a strategy can guarantee that emergency access request with more calls is preferentially dequeued.

In some other possible embodiments of the present disclosure, allocating the emergency access request in the unified queuing queue to the target alarm dispatching seat supporting the corresponding access means includes:

allocation mode II:
determining an emergency access request to be dequeued from the unified queuing queue; and
selecting a target alarm dispatching seat supporting the access means of the emergency access request from a plurality of candidate alarm dispatching seats, and allocating the emergency access request to be dequeued to the target alarm dispatching seat.

Namely, in embodiments of the present disclosure, first determining an emergency access request to be dequeued, and then selecting a target alarm dispatching seat supporting the access means of the emergency access request for the determined emergency access request.

In a possible embodiment of the present disclosure, the target alarm dispatching seat is an alarm dispatching seat currently in an idle state.

In embodiments of the present disclosure, allocation mode II is generally applied to the following scenarios:

Scenario 1: a plurality of alarm dispatching seats are currently in an idle state;

Scenario II: there are currently a plurality of alarm dispatching seats in an idle state and the plurality of alarm dispatching seats support the same kind of access means.

In some possible embodiment of the present disclosure, determining an emergency access request to be dequeued from the unified queuing queue includes:

if there are currently a plurality of alarm dispatching seats in an idle state, or if there are currently a plurality of alarm dispatching seats supporting the same access means in an idle state, determining an emergency access request to be dequeued from the unified queuing queue, wherein the access means of the emergency access request to be dequeued is the same as the access means supported by at least one alarm dispatching seat in the plurality of alarm dispatching seats in an idle state. That is, in the alarm dispatching seats in the idle state, there must be an alarm dispatching seat matching the access means of the selected emergency access request to be dequeued, so that the selected emergency access request to be dequeued can be smoothly allocated.

In some possible embodiments of the present disclosure, the emergency access request to be dequeued is determined from the unified queuing queue according to at least one of the following strategies:

1) rounding according to the sequence of the emergency access request;
such a strategy ensures that the emergency access request in each of the subqueues has a chance to dequeue.
2) random selection;
such a strategy ensures that the emergency access request in each of the subqueues has almost the same probability of being dequeued.
3) selecting according to the time when the emergency access request enters the unified queuing queue;
such a strategy ensures that the emergency access request that first enters unified queuing queue is preferentially dequeued.
4) selecting according to the waiting time of the emergency access request at the unified queuing queue;
such a strategy can guarantee a high latency emergency access request to be dequeued first.
5) selecting according to the length of subqueue;
for example, selecting a subqueue with the longest length from at least two matched subqueues; the length of the subqueue refers to the number of stored emergency access request.
such a strategy can guarantee that emergency access request in subqueue with a large number of emergency access requests are preferentially dequeued.
6) selecting according to the number of calls corresponding to emergency access request.
such a strategy can guarantee that emergency access request with more calls is preferentially dequeued.

In some possible embodiments of the present disclosure, the emergency access request for dequeuing processing includes at least one of: request origin, number, identity, incoming time, waiting time, number of incoming calls, etc.

In some possible embodiments of the present disclosure, selecting a target alarm dispatching seat supporting the access means of the emergency access request from a plurality of candidate alarm dispatching seat according to at least one of the following strategies includes:

1) selecting according to the number of received alarms;
for example, alarm dispatching seat with less number of received alarms is preferred.
2) selecting according to the duration of received alarms;
for example, alarm dispatching seat with a short alarm receipt duration is preferred.
3) polling selection according to the sequence of an alarm dispatching seat;
4) random selection;
5) selecting according to the weight;
6) selecting according to a history record of received alarms;
for example, preference is given to alarm dispatching seat that last processed.
7) selecting according to the source of emergency access request.
for example, if the sources of multiple access means are the same, the same alarm dispatching seat process is preferred.
8) selecting the alarm dispatching seat that last processed the same access type.

For example, if the alarm dispatching seat last processed the emergency access request for voice or video access means, the emergency access request for voice or video access means is preferentially allocated.

That is to say, allocating the emergency access request in the unified queuing queue to the target alarm dispatching seat supporting the corresponding access means further includes:

determining to adopt allocation mode I or allocation mode II, wherein:
if only one alarm dispatching seat is currently in an idle state, or if only one alarm dispatching seat currently supporting the same access means is in an idle state, the allocation mode I is adopted;
if there are currently a plurality of alarm dispatching seats in an idle state, or if there are currently a plurality of alarm dispatching seats supporting the same access means in an idle state, the allocation mode II is used.

In the above-mentioned embodiment of the present disclosure, emergency access requests of different access means are uniformly scheduled to different alarm dispatching seats via a uniform queuing dispatching algorithm to increase the multiplexing rate of the alarm dispatching seats, and a plurality of dispatching algorithms can be supported to realize reasonable allocation of resources and avoid unreasonable allocation problems such as resources being idle and contention.

In a possible embodiment of the present disclosure, an emergency access request in the unified queuing queue is allocated to a target alarm dispatching seat supporting a corresponding access means, and then further including: transferring the emergency access request from the alarm dispatching seat that originally received the emergency access request to other alarm dispatching seat. That is, emergency access request can be switched between alarm dispatching seats as needed. For example, the emergency access request may also be transferred to an emergency substation for reception by a dispatching seat at the substation.

In a possible embodiment of the present disclosure, the emergency access request is transferred from the alarm dispatching seat which originally received the emergency access request to other alarm dispatching seat according to at least one of the following information:

a service type supported by the alarm dispatching seat, the service type including at least one of the following: alarm reception, complaints and consultation; and     the expertise of dispatchers at the alarm dispatching seat.

Figure 3:
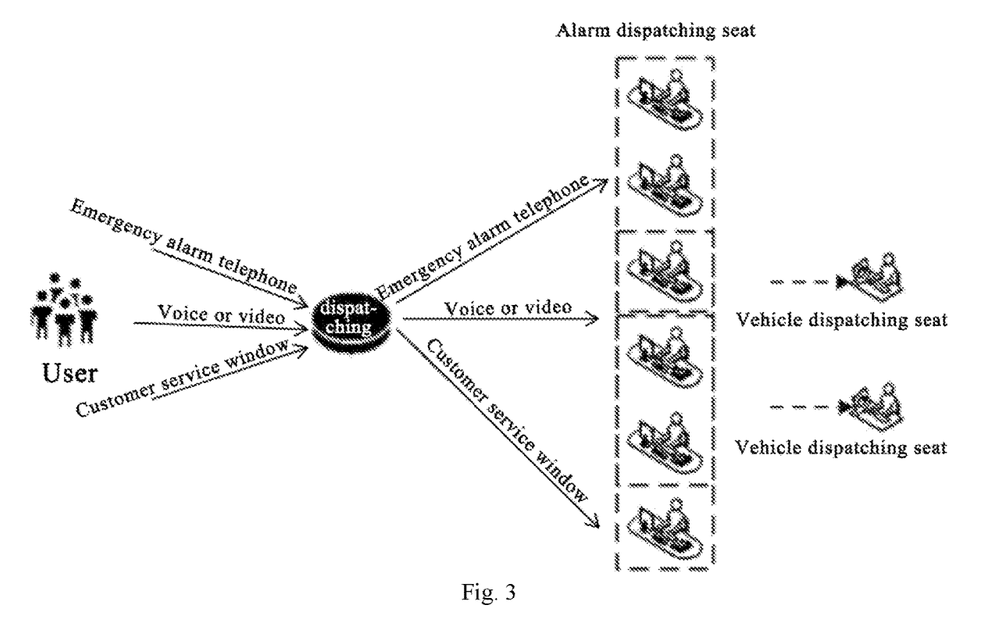
FIG. 3 is a schematic diagram of the structure of a emergency management system according to another embodiment of the present disclosure.

In embodiments of the present disclosure, in different dispatching centers, the responsibilities of the dispatcher are different, and there is a case where the dispatcher only has the function of dispatching vehicles and cannot receive an alarm. Such a scenario needs to be considered in the dispatching process, so as to more effectively schedule various parts of resources. Thus, in a possible embodiment of the present disclosure, referring to FIG. 3, an emergency access request in the unified queuing queue is allocated to a target alarm dispatching seat supporting a corresponding access means, and then further including: sending a vehicle dispatching request of the target alarm dispatching seat to a vehicle dispatching seat, and the vehicle dispatching seat uniformly allocating an emergency vehicle, wherein the vehicle dispatching seat does not support receiving an emergency access request and supports dispatching the emergency vehicle. For example, the vehicle dispatching seat may be located in a emergency substation.

In a possible embodiment of the present disclosure, an emergency access request in the unified queuing queue is allocated to a target alarm dispatching seat supporting a corresponding access means, and then further including: updating the state of the target alarm dispatching seat to a busy state until the target alarm dispatching seat finishes receiving an alarm this time.

In embodiments of the present disclosure, according to different access means of emergency access request, the dispatching seats are divided into various types of alarm dispatching seat (e.g. alarm dispatching seat for emergency emergency call access means and alarm dispatching seat for customer window access means). For the service mode which does not support receiving the emergency access request and needs to support dispatching the emergency vehicle, adding a vehicle dispatching seat with a dispatching function which can receive the Instruction of the alarm dispatching seat, dispatching vehicles and realizing service closed loop; on the premise of meeting the alarm through different channels, it also meets the normal development of different emergency center business models.

It should be noted that although the steps of the methods of the present disclosure are depicted in the drawings in a particular order, this does not require or imply that the steps be performed in the particular order, or that all illustrated steps be performed, to achieve the desired results. Additionally or alternatively, certain steps may be omitted, multiple steps combined into one step execution, and/or one step decomposed into multiple step to execute, etc.

Figure 4:
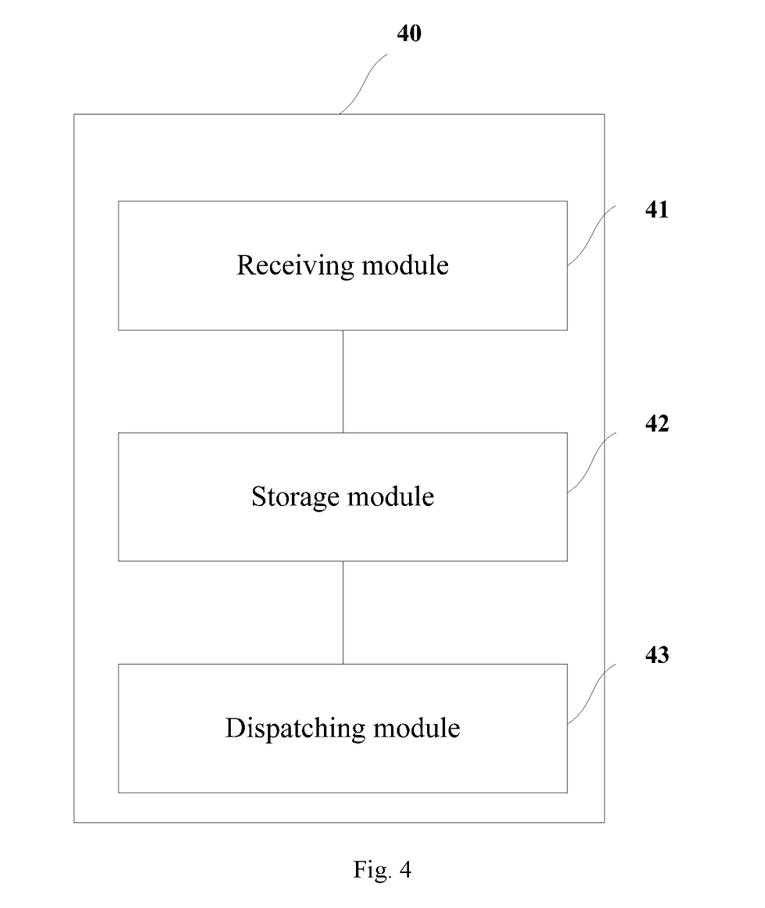
FIG. 4 is a schematic diagram of the structure of a emergency management system according one yet another embodiment of the present disclosure.

With reference to FIG. 4, embodiments of the present disclosure provide an emergency alarm processing system 40, including:

a receiving module 41 for receiving the emergency access request;

a storage module 42, used for storing the emergency access request into a subqueue of a unified queuing queue according to the access means of the emergency access request, wherein the unified queuing queue includes at least two subqueues, each of the subqueues is used for storing the emergency access request of at least one access means, and the access means of the emergency access request stored in each of the subqueues is different; and     a dispatching module 43 for allocating the emergency access request in the unified queuing queue to the target alarm dispatching seat supporting the corresponding access means.

In a possible embodiment of the present disclosure, the access means includes at least two of: the emergency alarm telephone access means, the voice or video access means and the customer service window access means.

In a possible embodiment of the present disclosure, allocating the emergency access request in the unified queuing queue to the target alarm dispatching seat supporting the corresponding access means includes:

allocation mode I:

determining a target alarm dispatching seat of the emergency access request to be received; and     selecting an emergency access request matching the access means supported by the target alarm dispatching seat from the unified queuing queue, and allocating the selected emergency access request to the target alarm dispatching seat;

or allocation mode II:

determining an emergency access request to be dequeued from the unified queuing queue; and     selecting a target alarm dispatching seat supporting the access means of the emergency access request from a plurality of candidate alarm dispatching seats, and allocating the emergency access request to be dequeued to the target alarm dispatching seat.

In a possible embodiment of the present disclosure, the target alarm dispatching seat is a alarm dispatching seat currently in an idle state.

In a possible embodiment of the present disclosure, allocating the emergency access request in the unified queuing queue to the target alarm dispatching seat supporting the corresponding access means further includes:

determining to adopt allocation mode I or allocation mode II, wherein:

if only one alarm dispatching seat is currently in an idle state, or if only one alarm dispatching seat currently supporting the same access means is in an idle state, the allocation mode I is adopted;

if there are currently a plurality of alarm dispatching seats in an idle state, or if there are currently a plurality of alarm dispatching seats supporting the same access means in an idle state, the allocation mode II is used.

In a possible embodiment of the present disclosure, in the allocation mode I, selecting an emergency access request matching the access means supported by the target alarm dispatching seat from the unified queuing queue includes:

if the target alarm dispatching seat only supports listening to an emergency access request of an access means, selecting an emergency access request from the subqueue matching the access means supported by the target alarm dispatching seat.

In a possible embodiment of the present disclosure, in the allocation mode I, selecting an emergency access request matching the access means supported by the target alarm dispatching seat from the unified queuing queue includes:

if the target alarm dispatching seat supports listening to an emergency access request of at least two access means, selecting an emergency access request from at least two subqueues matching the at least two access means supported by the target alarm dispatching seat.

In a possible embodiment of the present disclosure, an emergency access request is selected from the unified queuing queue according to at least one of the following strategies:

rounding according to the sequence of the emergency access request;
random selection;
selecting according to the time when the emergency access request enters the unified queuing queue;
selecting according to the waiting time of the emergency access request at the unified queuing queue;
selecting according to the length of subqueue; and
select according to the number of calls corresponding to the emergency access request.

In a possible embodiment of the present disclosure, determining the emergency access request to be dequeued from the unified queuing queue includes:

if there are currently a plurality of alarm dispatching seats in an idle state, or if there are currently a plurality of alarm dispatching seats supporting the same access means in an idle state, determining an emergency access request to be dequeued from the unified queuing queue, the access means of the emergency access request to be dequeued being the same as the access means supported by at least one alarm dispatching seat in the plurality of alarm dispatching seats in an idle state.

In a possible embodiment of the present disclosure, selecting a target alarm dispatching seat supporting the access means of emergency access requests from a plurality of candidate alarm dispatching seats according to at least one of the following strategies includes:

selecting according to the number of received alarms;
selecting according to the duration of received alarms;
polling selection according to the sequence of the alarm dispatching seat;
random selection;
selecting according to the weight;
selecting according to the history record of received alarms;
selecting according to the source of the emergency access request; and
selecting the alarm dispatching seat that last processed the same access type.

In a possible embodiment of the present disclosure, the emergency alarm processing system 40 further includes:

a transferring module for transferring the emergency access request from the alarm dispatching seat which originally receives the emergency access request to other alarm dispatching seat.

In a possible embodiment of the present disclosure, transferring the emergency access request from the alarm dispatching seat that originally received the emergency access request to other alarm dispatching seat according to at least one of the following information:

a service type supported by the alarm dispatching seat, the service type including at least one of the following: alarm reception, complaints and consultation; and
the expertise of dispatchers at the alarm dispatching seat.

In a possible embodiment of the present disclosure, the emergency alarm processing system 40 further includes:

a sending module for sending a vehicle dispatching request of the target alarm dispatching seat to a vehicle dispatching seat, and the vehicle dispatching seat uniformly allocating an emergency vehicle, wherein the vehicle dispatching seat does not support receiving an emergency access request and supports dispatching the emergency vehicle.

In a possible embodiment of the present disclosure, the emergency alarm processing system 40 further includes:

an updating module for updating the state of the target alarm dispatching seat to a busy state until the target alarm dispatching seat finishes receiving an alarm this time.

It should be noted that while several modules or cells of equipment for action execution are mentioned in the above detailed description, such partitioning is not mandatory. Indeed, the features and functions of two or more module or cell described above may be embodied in one module or cell according to the embodiment of the present disclosure. Conversely, the features and functions of one module or cell described above can be further divided into being embodied by multiple modules or cells.

Figure 5:
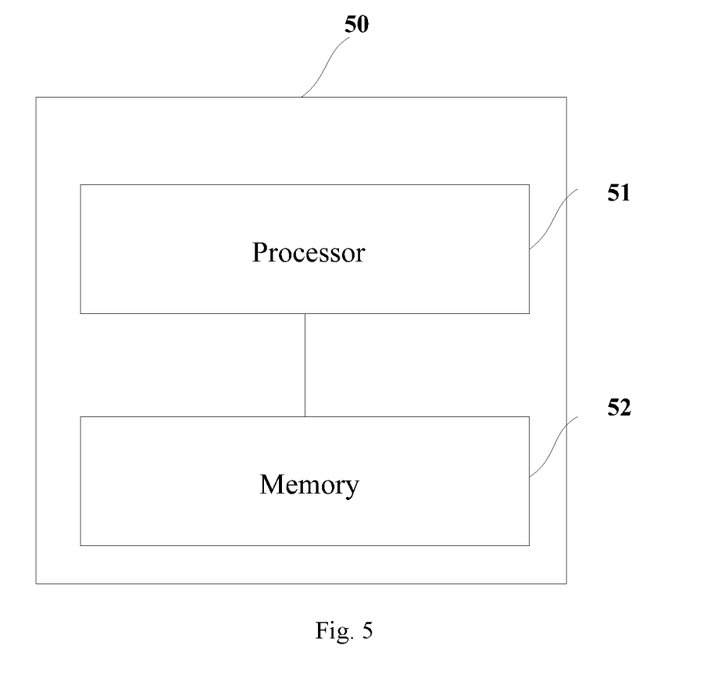
FIG. 5 is a schematic diagram of the structure of an electronic device according to one embodiment of the present disclosure.

With reference to FIG. 5, embodiments of the present disclosure provide an electronic device 50, including a processor 51, a memory 52, and a computer program which is stored on the memory 52 and can run on the processor 51, and when the computer program is executed by the processor 51, various processes of the above-mentioned embodiments of emergency alarm processing method are implemented, and the same technical effect can be achieved, and in order to avoid repetition, the description thereof will not be repeated here.

Embodiments of the present disclosure further provide a computer readable storage media, the computer readable storage media storing a computer program, the computer program realizing each process of the above-mentioned embodiments of the emergency alarm processing method when executed by a processor, and being able to achieve the same technical effect, and in order to avoid repetition, the description thereof will not be repeated here. The computer readable storage media may be Read-Only Memory, Random Access Memory=, magnetic disk or optical disk, etc.

It should be noted that, as used herein, the terms "include", "comprise", or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "includes a . . . " does not, without more constraints, preclude the existence of additional identical elements in the process, method, article, or apparatus that includes the element.

From the above-described embodiments, it is clear to a person skilled in the art that the above embodiments can be implemented by means of software plus the necessary general hardware platform, but of course also by means of hardware, but in many cases the former is a better embodiment. Based on this understanding, the technical solution of the present disclosure can be embodied in the form of a software product stored in a storage media (e. g. ROM/RAM, magnetic disk, optical disk), including a plurality of Instructions to enable a terminal (which may be a cell phone, computer, server, air conditioner, or network equipment, etc.) to perform the methods described in each embodiment of the present disclosure.

Although the embodiments of the present disclosure have been described above with reference to the accompanying drawings, the present disclosure is not limited to the specific embodiment described above. The specific embodiment described above are merely illustrative and not restrictive, and those skilled in the art, in light of the present disclosure, can make many changes without departing from the range as claimed in the spirit and claims of the present disclosure.

What is claimed is:

1. An emergency alarm processing method, comprising:
receiving an emergency access request;
according to access means of the emergency access request, storing the emergency access request into subqueues of a unified queuing queue, wherein the unified queuing queue comprises at least two subqueues, each of the subqueues is used for storing the emergency access request of at least one access means, and the access means of the emergency access request stored in each of the subqueues are different from each other; and
allocating the emergency access request in the unified queuing queue to a target alarm dispatching seat supporting a corresponding access means;
wherein the allocating the emergency access request in the unified queuing queue to the target alarm dispatching seat supporting the corresponding access means comprises:
allocation mode I:
determining a target alarm dispatching seat of an emergency access request to be received;
selecting an emergency access request matching the access means supported by the target alarm dispatching seat from the unified queuing queue, and allocating a selected emergency access request to the target alarm dispatching seat;
or
allocation mode II:
determining an emergency access request to be dequeued from the unified queuing queue; and
selecting a target alarm dispatching seat supporting the access means of the emergency access request from a plurality of candidate alarm dispatching seats, and allocating the emergency access request to be dequeued to the target alarm dispatching seat.

2. The method according to claim 1, wherein the access means comprises at least two of: emergency alarm telephone access means, voice or video access means and customer service window access means.

3. The method according to claim 1, wherein the target alarm dispatching seat is an alarm dispatching seat in an idle state.

4. The method according to claim 1, wherein the allocating the emergency access request in the unified queuing queue to the target alarm dispatching seat supporting the corresponding access means further comprises:
determining to adopt allocation mode I or allocation mode II, wherein:
if only one alarm dispatching seat is in an idle state, or if only one alarm dispatching seat supporting the same access means is in the idle state, the allocation mode I is adopted; and
if there are a plurality of alarm dispatching seats in the idle state, or if there are a plurality of alarm dispatching seats supporting the same access means in the idle state, the allocation mode II is adopted.

5. The method according to claim 1, wherein in the allocation mode I, the selecting an emergency access request matching the access means supported by the target alarm dispatching seat from the unified queuing queue comprises:
if the target alarm dispatching seat only supports listening to an emergency access request of an access means, selecting an emergency access request from a subqueue matching the access means supported by the target alarm dispatching seat.

6. The method according to claim 1, wherein in the allocation mode I, the selecting an emergency access request matching the access means supported by the target alarm dispatching seat from the unified queuing queue comprises:
if the target alarm dispatching seat supports listening to emergency access requests of at least two access means, selecting an emergency access request from at least two subqueues matching the at least two access means supported by the target alarm dispatching seat.

7. The method according to claim 1, wherein an emergency access request is selected from the unified queuing queue according to at least one of the following strategies:
rounding according to a sequence of the emergency access request;
random selection;
selecting according to a time point when the emergency access request enters the unified queuing queue;
selecting according to a waiting time of the emergency access request at the unified queuing queue;
selecting according to a length of subqueue; and
selecting according to a number of calls corresponding to the emergency access request.

8. The method according to claim 4, wherein the determining an emergency access request to be dequeued from the unified queuing queue comprises:
if there are currently a plurality of alarm dispatching seats in the idle state, or if there are currently a plurality of alarm dispatching seats supporting the same access means in the idle state, determining an emergency access request to be dequeued from the unified queuing queue, the access means of the emergency access request to be dequeued being the same as the access means supported by at least one alarm dispatching seat among the plurality of alarm dispatching seats in the idle state.

9. The method according to claim 1, wherein according to at least one of the following strategies, the selecting a target alarm dispatching seat supporting the access means of the emergency access request from a plurality of candidate alarm dispatching seats comprises:
selecting according to a number of received alarms;
selecting according to a duration of received alarms;
polling selection according to a sequence of the alarm dispatching seat;
random selection;
selecting according to a weight;
selecting according to a history record of received alarms;
selecting according to a source of the emergency access request; and
selecting the alarm dispatching seat that last processed the same access type.

10. The method according to claim 1, wherein after allocating the emergency access request in the unified queuing queue to the target alarm dispatching seat supporting the corresponding access means, the method further comprises:
transferring the emergency access request from an alarm dispatching seat that originally received the emergency access request to other alarm dispatching seat.

11. The method according to claim 10, wherein the emergency access request is transferred from the alarm dispatching seat that originally received the emergency access request to other alarm dispatching seats according to at least one of the following information:

service types supported by the alarm dispatching seat, wherein the service types comprise at least one of the following: alarm reception, complaints and consultation; and expertise of dispatchers at the alarm dispatching seat.

12. The method according to claim 1, wherein after allocating the emergency access request in the unified queuing queue to the target alarm dispatching seat supporting the corresponding access means, the method further comprises:
sending a vehicle dispatching request of the target alarm dispatching seat to a vehicle dispatching seat, wherein the vehicle dispatching seat allocates emergency vehicles uniformly, wherein the vehicle dispatching seat does not support receiving the emergency access request and supports dispatching the emergency vehicle.

13. The method according to claim 1, wherein after allocating the emergency access request in the unified queuing queue to the target alarm dispatching seat supporting the corresponding access means, the method further comprises:
updating a state of the target alarm dispatching seat to a busy state until the target alarm dispatching seat finishes receiving an alarm this time.

14. An emergency alarm processing system, comprising:
a receiving module for receiving an emergency access request;
a storage module for storing the emergency access request into subqueues of a unified queuing queue according to access means of the emergency access request, wherein the unified queuing queue comprises at least two subqueues, each of the subqueues is used for storing an emergency access request of an access means, and the access means of the emergency access request stored in each of the subqueues are different from each other; and
a dispatching module for allocating an emergency access request in the unified queuing queue to a target alarm dispatching seat supporting a corresponding access means;
wherein the allocating the emergency access request in the unified queuing queue to the target alarm dispatching seat supporting the corresponding access means comprises:
allocation mode I:
determining a target alarm dispatching seat of an emergency access request to be received;
selecting an emergency access request matching the access means supported by the target alarm dispatching seat from the unified queuing queue, and allocating a selected emergency access request to the target alarm dispatching seat;
or
allocation mode II:
determining an emergency access request to be dequeued from the unified queuing queue; and
selecting a target alarm dispatching seat supporting the access means of the emergency access request from a plurality of candidate alarm dispatching seats, and allocating the emergency access request to be dequeued to the target alarm dispatching seat.

15. An electronic device, comprising a processor, a memory and a program or instruction stored on the memory and executable by the processor, the program or instruction, when executed by the processor, implements the steps of the emergency alarm processing method of claim 1.

16. A non-transitory readable storage media on which a program or instruction is stored, the program or instruction, when executed by a processor, implements the emergency alarm processing method of claim 1.

17. The method according to claim 4, wherein in the allocation mode I, the selecting an emergency access request matching the access means supported by the target alarm dispatching seat from the unified queuing queue comprises:
if the target alarm dispatching seat only supports listening to an emergency access request of an access means, selecting an emergency access request from a subqueue matching the access means supported by the target alarm dispatching seat.

18. The method according to claim 4, wherein in the allocation mode I, the selecting an emergency access request matching the access means supported by the target alarm dispatching seat from the unified queuing queue comprises:
if the target alarm dispatching seat supports listening to emergency access requests of at least two access means, selecting an emergency access request from at least two subqueues matching the at least two access means supported by the target alarm dispatching seat.

19. The method according to claim 4, wherein an emergency access request is selected from the unified queuing queue according to at least one of the following strategies:
rounding according to a sequence of the emergency access request;
random selection;
selecting according to a time point when the emergency access request enters the unified queuing queue;
selecting according to a waiting time of the emergency access request at the unified queuing queue;
selecting according to a length of subqueue; and
selecting according to a number of calls corresponding to the emergency access request.

* * * * *